(12) United States Patent
Hofmann

(10) Patent No.: US 6,506,835 B1
(45) Date of Patent: Jan. 14, 2003

(54) POLYMER BLENDS OF POLYVINYL BUTYRAL

(75) Inventor: George Henry Hofmann, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/592,497

(22) Filed: Jun. 12, 2000

Related U.S. Application Data

(63) Continuation-in-part of application No. 09/073,296, filed on May 6, 1999, now abandoned.

(51) Int. Cl.$^7$ .......................... C08L 27/06; C08L 29/14
(52) U.S. Cl. ............................ 525/63; 525/64; 525/70; 525/74; 525/401; 525/222; 525/227; 525/231; 525/239; 525/298; 525/302; 524/502
(58) Field of Search ............................... 525/222, 227, 525/231, 239, 298, 302, 63, 64, 70, 74, 401; 524/502

(56) References Cited

U.S. PATENT DOCUMENTS

| 3,780,140 A | 12/1973 | Hammer |
| 5,380,794 A | 1/1995 | Schaefer et al. .............. 525/57 |
| 5,618,881 A | 4/1997 | Hojabr ........................ 525/64 |

FOREIGN PATENT DOCUMENTS

| DE | 843 468 | 7/1952 |
| EP | 0 605 994 | 7/1994 |
| EP | 0 647 660 | 4/1995 |
| EP | 950688 | * 10/1999 |

OTHER PUBLICATIONS

PCT/US99/09868 PCT International Search Report dated Sep. 2, 1999.

* cited by examiner

*Primary Examiner*—Jeffrey Mullis

(57) ABSTRACT

A novel composition is disclosed which comprises polyvinyl chloride, an ethylene-based copolymer as a compatibilizer, inorganic fillers and from about 5 to 95 percent by weight of either virgin or recycled/recovered polyvinyl butyral. A process for preparing this novel composition is also provided.

13 Claims, No Drawings

POLYMER BLENDS OF POLYVINYL BUTYRAL

CROSS-REFERENCE TO RELATED APPLICATION

This application is a continuation-in-part of U.S. application Ser. No. 09/073,296 filed May 6, 1999, now abandoned.

FIELD OF THE INVENTION

The present invention relates to the use of polyvinyl butyral as a component for alloying into blends of polyvinyl chloride and ethylene copolymers, and compositions and shaped articles formed therefrom.

BACKGROUND OF THE INVENTION

Plasticized polyvinyl butyral (PVB) is a resinous material used in large quantities as an interlayer in laminated safety glass for windows in buildings and windshields in automobiles. The glass from these safety glasses can be recovered by conventional techniques such as grinding, crushing, and milling the scrap glass to recover the glass cullet to the glass manufacturer, while the PVB is disposed of in landfills or incinerators. It is estimated that the supply of post-consumer PVB waste and scrap is between 35 to 45 MM pounds a year.

U.S. Pat. No. 5,380,794 suggests an approach to recycle or recover PVB, by using the material as tackifier in the manufacture of resilient flooring material. The PVB provides a tackiness, or sticky property, to the surface of a polyvinyl chloride (PVC) composition. However, it is suggested that PVB be used in a limited amount of 0.5 to 4% by weight and preferably about 0.75% to 1.25% by weight in a composition comprising PVC and inorganic fillers.

It has been known in the art to add plasticizers to PVC to improve its flexibility. U.S. Pat. No. 3,780,140 discloses the use of an ethylene copolymer as an effective plasticizer for PVC. Considering the abundant amount of post-consumer PVB available for recycling, it would be desirable to replace some of the ethylene copolymer plasticizers with PVB to give flexibility and elastomeric property to PVC. There would be a desirable side effect of addressing industrial and environmental concerns by finding a way to efficiently and economically recover PVB.

SUMMARY OF THE INVENTION

Accordingly, the present invention provides a novel composition comprising a high percentage of virgin, recycled or recovered polyvinyl butyral (PVB), from about 5–95 weight percent (wt. %) PVB, 5–95 wt. % polyvinyl chloride (PVC), 1–50 wt. % of a high-molecular weight solid ethylene-containing plasticizer, 0–90 wt. % inorganic fillers, and 0–50 wt. % of a low-molecular weight liquid plasticizer, whereby the weight percent totals 100. The high-molecular weight solid ethylene-containing plasticizer is selected from the group consisting of: a) an ethylene/alkyl acrylate copolymer; b) an ethylene/alkyl acrylate/carbon monoxide copolymer; c) an ethylene/alkyl acrylate/carbon monoxide copolymer grafted with carboxylic acid anhydride groups; d) an ethylene/alkyl acrylate/mono methyl maleate copolymer; e) an ethylene/alkyl acrylate copolymer grafted with carboxylic acid anhydride groups; f) an ethylene/vinyl acetate copolymer; g) an ethylene/vinyl acetate copolymer grafted with carboxylic acid anhydride groups; h) an ethylene/vinyl acetate/carbon monoxide copolymer; and i) an ethylene/vinyl acetate/carbon monoxide copolymer grafted with carboxylic acid anhydride groups.

There is also provided a process for preparing a novel composition comprising a large amount of virgin, recycled or recovered polyvinyl butyral of up to 95 wt. % PVB, 5–95 wt. % PVC, 1–50 wt. % a high-molecular weight solid ethylene-containing plasticizer, 0–90 wt. % inorganic fillers, and 0–50 wt. % a low-molecular weight liquid plasticizer, whereby the weight percent totals 100.

DETAILED DESCRIPTION OF THE INVENTION

The composition of the present invention provides a new utility for polyvinyl butyral (PVB) in a blend of polyvinyl chloride (PVC) and a plasticizer as a compatibilizer.

The polyvinyl chloride in this disclosure can be a homopolymer of vinyl chloride or a copolymer of vinyl chloride with a small amount, e.g., up to 20 weight percent, of another copolymerizable monomer well-known commercially (such as vinyl acetate) which does not change the essential character of the homopolymer. The term PVC is used generally to mean the polymer alone which is a stiff, somewhat brittle polymer. The PVC will generally have a glass transition temperature ($T_g$) of about 80° C. and will normally be melt processed by itself at a temperature of 180–200° C.

The polyvinyl butyral in accordance with this invention may be virgin vinyl butyral, that is PVB which has not been used previously. However, it is preferred that the PVB be recovered or recycled to provide a lower cost but equally high quality raw material for the blend. The kind of recovered or recycled PVB is not critical to the working of the invention. It has been found that recovered or recycled PVB of different kinds and from different manufacturing origins, as well as mixtures of different kinds of PVB, are suitable for use in accordance to this invention. The recovered or recycled PVB can contain common additives and contaminants such as plasticizers, sand, and fine glass particles and still acceptable for use in the invention.

PVB is a complex resin which may be manufactured, depending upon the desired application, with large variations in respect to structural features and composition. Acetals, such as polyvinyl butyral, are formed by the well-known reaction between aldehydes and alcohols. The addition of one molecule of an alcohol to one molecule of an aldehyde produces a hemiacetal. Hemiacetals are rarely isolated, because of their inherent instability, but rather, are further reacted with another molecule of alcohol to form a stable acetal. Polyvinyl acetals are prepared from aldehydes and polyvinyl alcohols. Polyvinyl alcohols are high molecular weight resins containing various percentages of hydroxyl and acetate groups produced by hydrolysis of polyvinyl acetate. The conditions of the acetal reaction and the concentration of the particular aldehyde and polyvinyl alcohol used are closely controlled to form polymers containing predetermined proportions of hydroxyl groups, acetate groups and acetal groups. The primary differences between different types of polyvinyl butyral relate to differences in molecular weight, differences in the content of hydroxyl, butyral and residual ester groups, and differences in the type and content of other additives. A typical polyvinyl butyral resin may have a molecular weight range, according to the Staudinger equation, of from about 30,000 to about 600,000, a range of from about 12% to about 20% by weight of hydroxyl groups calculated as the polyvinyl alcohol, and a range of from 0% to about 3% by weight residual ester groups calculated as polyvinyl acetate.

A third component of the melt blend of the present invention is an ethylene polymer with carboxyl and/or carbon monoxide functionalities as a solid plasticizer. Plasticizers of the type can be prepared by well-known methods of free-radical, high-pressure polymerization as described in U.S. Pat. No. 3,780,140 entitled "Ethylene/Carbon Monoxide Polymer Composition." Examples of this ethylene polymer plasticizer includes: a) ethylene terpolymers of the general formula E/X/CO where E is the ethylene, X is a "softening" monomer such as, for example, vinyl acetate or an acrylic ester, and CO is the carbon monoxide functionality; b) ethylene carbon monoxide-functional copolymer that is anhydride modified in the form of E/X/CO/grafted MAH, e.g., obtained by grafting reaction between the preformed copolymer with maleic acid or maleic anhydride; c) ethylene copolymers of the general formula E/X, including copolymers of ethylene with methyl acrylate, butyl acrylate, and; d) ethylene terpolymers of the formula E/X/grafted MAH, e.g., containing carboxylic acid anhydride groups pendant from the polymer backbone.

Examples of carboxyl-functionalized ethylene polymer "E/X" are copolymers of ethylene with C3–C12 ethylenically unsaturated monocarboxylic acids, C1–C18 alkyl esters of ethylenically unsaturated C3–C12 monocarboxylic acids, and vinyl esters of C3–C18 saturated carboxylic acids. More specific examples include ethylene/vinyl acetate copolymer and ethylene/alkyl (meth)acrylic acid copolymer, wherein the alkyl group contains 1 to 8 carbon atoms. Such ethylene polymers include copolymers of ethylene with vinyl acetate, methyl acrylate, propyl acrylate, n-butyl acrylate, hexyl acrylate, or n-butyl acrylate. For these polymers, the proportion of ethylene will generally be about 30 to 60 weight percent, with the carboxyl functionality being about 40 to 70 weight percent, to total 100 weight percent of the copolymer.

Ethylene terpolymers of the general formula "E/X/CO" are plasticizers functionalized with carbon monoxide which enables a small amount of acetate or acrylate to be used. Preferred such polymers are ethylene/alkyl (meth) acrylate/carbon monoxide copolymer wherein the alkyl group can have the identities described above. Also preferred are ethylene/vinyl acetate/carbon monoxide copolymers. Generally for these copolymers the proportion of ethylene will be about 50 to 70 weight percent, the proportion of acrylate or acetate will be about 24 to 40 weight percent, and the proportion of carbon monoxide will be about 5 to 15 weight percent, to total 100 weight percent of the ethylene polymer.

The ethylene carboxyl and/or carbon monoxide-functional copolymer in the form of being anhydride modified, i.e., "E/X/grafted MAH" or "E/X/CO/grafted MAH" contains carboxylic acid anhydride groups pendant from the polymer backbone. Anhydride modification typically is obtained by grafting reaction between the preformed copolymer with maleic acid or maleic anhydride to form succinic anhydride groups on the copolymer by conventional procedures. Techniques for the grafting of such monomers are known, e.g., as described in U.S. Pat. No. 5,618,881 entitled "Compatibilizer Composition". Typically, the amount of anhydride modification will be about 0.1 to 5 weight percent based on the weight of the copolymer.

A preferred ethylene polymer is ethylene/alkyl acrylate/CO copolymer modified with succinic anhydride, wherein the alkyl group has 1 to 4 carbon atoms, and is preferably n-butyl acrylate. Other preferred polymers capable of plasticizing PVC include ethylene copolymers containing high levels (greater than 40%) of the comonomer vinyl acetate or methyl acrylate. Acid functionality of these copolymers enhances even further the tensile strength and notched Izod toughness of blends relative to other non-acid functional copolymers.

PVB by itself is immiscible in PVC, forming incompatible domains of up to 5 $\mu$m in diameter of PVB in PVC. However, it is found that when the third component functionalized ethylene polymer is present in the blend, the domain size of PVB is reduced to less than 0.5 $\mu$m when comparing a transmission electron micrograph (TEM) of a PVB/PVC blend to a TEM of a PVB/PVC/ethylene copolymer blend of the present invention. The former shows a great deal of PVB phase separation, while the latter shows small and uniform domains of PVB dispersed in the matrix of other polymers. The dispersion of PVB with the addition of the functionalized ethylene polymer in the present invention is accompanied by a corresponding increase in tensile strength and elongation, as well as a dramatic increases in the notched Izod toughness and the melt index.

The amount of functionalized ethylene polymer should be in an effective amount to compatibilize the PVB and the PVC one with another. In addition to the three components described above, the composition according to the invention can also comprise up to 90 weight percent of the total weight in inorganic fillers such as clay and limestone, as well as the customary additives including stabilizers; anti-oxidants; viscosity improvers; UV absorbers; various light and/or heat stabilizers; coloring agents and pigments such as titanium dioxide; metal deactivators; free-radical scavengers; reinforcing agents; lubricants; emulsifiers; optical brighteners; flame-proofing agents; anti-static agents; blowing agents; flow auxiliaries; bacteriostats and bactericides; surfactants and many other conventional and well known additives and improvement agents. The specific nature and particular physical and chemical properties of these additives do not, in general, relate to the essence of the present inventive concept. Therefore, further specific elaboration of such fillers/additives is believed not to be required.

In addition to fillers I additives, up to 50 percent of total weight in liquid plasticizers can also be included in the composition of the present invention. Liquid plasticizers are advantageously available on the market from various companies including Monsanto Company of St. Louis, Mo. The liquid plasticizers preferably comprise ester compounds such as monomeric phthalate esters, dibasic acid esters, trimellitates, phosphate esters and polyesters, with monomeric phthalate esters being the most preferred. Liquid plasticizers comprising monomeric phthalate esters are preferably selected from the group comprising dibutyl phthalate (DBP), dibutoxy ethyl phthalate (DBEP), butyl benzyl phthalate (BBP), butyl octyl phthalate (BOP), dihexyl phthalate (DHP), dioctyl phthalate (DOP), diisooctyl phthalate (DIOP), dicapryl phthalate (DCP), dicapryldioctyl phthalate (DCOP), diisononyl phthalate (DINP), diisodecyl phthalate (DIDP), ditridecyl phthalate and mixtures of these. Dibasic acid esters used as plasticizers are preferably selected from the group comprised of adipate esters, azelate esters and sebecate esters, and mixtures of these. Adipate esters are preferably selected from the group comprising dioctyl adipates (DOA), diisononyl adipate (DINA), diisodecyl adipate (DIDA) and mixtures of these. The azelate esters are preferably selected from the group comprising dioctyl azelate (DOZ), diisooctyl azelate (DIOZ), di-n-hexyl azelate and mixtures of these. When sebecate esters are used, dibutyl sebecate, dioctyl sebecate, dibenzyl sebecate, butyl benzyl sebecate and mixtures of these are preferred. Phosphate esters used as plasticizers according to the present invention are preferably selected from the group comprising tricresyl phosphate, cresyl diphenyl phosphate, octyl diphenyl phosphate and mixtures of these.

The proportions of PVC and PVB in the form of either virgin or recovered material, can vary widely in the composition of the present invention, e.g., in a range of 5 to 95 weight percent of each of these polymers out of a total 100 weight percent of the combined total. The amount of functionalized ethylene polymer as a compatibilizer is within the range of about 1 to 50 weight percent based on total combined weight of the final blend. Preferably, the functionalized ethylene polymer is in a minor proportion of about 2 to 15 weight percent, which enables a large amount of PVB in the range of about 20 to 75 weight percent to be used, and a relatively low amount of PVC of about 10 to 60 weight percent to be needed.

The composition according to the invention can be prepared by methods customary for mixing polymers and additives in plastics processing. The melt blending of the components can be carried out using conventional equipment such as batch mixers (Banbury) and extrusion screws in an extruder or injection-molding machine. Preferably these components are pre-blended such as by dry mixing together of the PVB, PVC, and ethylene polymer. When the PVB is from recycle, it will be as transparent or translucent strip forms or flakes. The PVC and ethylene polymer will be in the form of molding granules or powder dry blend. The melt blends of compositions of the present invention can be melt fabricated into a wide variety of articles by conventional processes such as extrusion and injection molding into such forms as films and molded articles such as containers.

The invention now being generally described, the same will be better understood with reference to the following embodiments and examples, which are intended for purposes of illustration only and not to be limiting of the invention except where so indicated.

In all examples, PVB was in the form of scrap Butacite® sheeting from E. I. du Pont de Nemours and Company of Wilmington, Del., U.S.A. ("DuPont"), comprising about 75 wt. % PVB and about 25 wt. % of an ester plasticizer. The PVC dry blend was of the formulation: 91.7 wt. % PVC with an inherent viscosity of 0.74 as determined by ASTM 1243 and available from Vista Chemicals as Vista® 5305, mixed with the following stabilizers: 3.7 wt. % of an alkyl tin mercaptide manufactured by Adeca-Argus as Mark 1900; 2.8 wt. % metallic stearates lubricant available from Hoechst as Wax E; 0.9 wt. % of an anti-oxidant hindered phenol, available from Ciba Geigy as Inorganox® 1098; and 0.9 wt. % of a sulfur-containing antioxidant from Sipro Kasei Co., Ltd. as Seenox® 412S. The samples were prepared using a Haake System 90 Rheocord® mixer equipped with a mixing bowl and roller blades. The mixer was started at about 50° C. and 75 RPM. All ingredients were added to the mixer except the PVC. After the mix appeared to be homogeneous in about 3–4 minutes, PVC dry blend was added to the mix and mixer speed was increased to 125 RPM. Mixing continued at about 190° C. at an increasing speed of 150–200 RPM for another 7 minutes or so. The melt blend samples were quickly discharged and quenched in dry ice, then vacuum-dried in oven.

Microscopic examination of the composition after blending was performed and transmission electron micrographs (TEM) were taken to measure the domain size of the dispersed PVB in the blend. Test specimens were compression molded (190° C., 40,000 psi) from the compositions prepared, and then tested for:

a) notched Izod impact strength using ASTM D-256;
b) tensile strength (maximum and break point in psi), using ASTM-D1708;
c) elongation (maximum and break in %), using ASTM D-1708;
d) melt index (MI) measured using ASTM D-1238 using a 2.16 kg weight, and measured at 190° C.;
e) hardness as determined by International Standard ISO 868-1978(E).

The hardness measured by this Standard is also known as Shore hardness. Hardness measurements were determined using type A and D Shore durometers.

Properties of the two starting materials, PVB and PVC dry blend, are as follows (Table 1):

TABLE 1

| Properties | PVB | PVC |
| --- | --- | --- |
| Modulus of elasticity (psi) | 288 | 163,239 |
| Tensile strength (psi) | 3567 | 8591 |
| Elongation @ max (%) | 384 | 7 |
| Tensile strength (break) (psi) | 3555 | 4674 |
| Elongation @ break (%) | 383 | 22 |
| Melt Index (gr/10 min-2160 g @ 190° C.) | 2.4 | 0.1 |
| Melt Index (gr/10 min-2160 g @ 190° C.) | 109 | 23 |
| Shore A (0/15 sec) | 63/45 | 95/95 |
| Shore D (0/15 sec) | 27/13 | 71/67 |

EXAMPLES 1–4

In examples 1–4, the solid plasticizer was an ethylene/carbon monoxide/n-butyl-acrylate copolymer (or EnBACO of the E/X/CO form) grafted with about 1% maleic anhydride available from DuPont as Fusabond® MG-175D. The small amount of antioxidant was in the form of 1,3-propanedyl 3,5-BIS (1,1-dimethylethyl)-alpha-hydroxyxbenene propanoate, available from CIBA-GEIGY Co., Ltd. in Switzerland as Irganox® 1010. As shown in Table 2, compared to a control PVC/PVB mix without any ethylene polymer compatibilizer, the elongation of the PVC/PVB mix with the solid plasticizer as a compatibilizer increased dramatically as well as the notched Izod toughness. Melt index decreased as compared to the control mix, indicating a higher grafting level between the PVB and PVC phase as the PVC miscible compatibilizer increased. The increased compatibilizer levels also led to correspondingly decreased PVB phase domains.

TABLE 2

| | Control Example 1 Parts | Example 2 Parts | Example 3 Parts | Example 4 Parts |
| --- | --- | --- | --- | --- |
| Ingredients | | | | |
| PVC dry blend | 100 | 100 | 100 | 100 |
| PVB | 50 | 50 | 50 | 50 |
| EnBaCO-g-MAH | 0 | 5 | 10 | 20 |
| Anti-oxidant Irganox ® 1010 | 1 | 1 | 1 | 1 |
| Properties | | | | |
| Modulus of elasticity (psi) | 109,672 | 81,149 | 58,636 | 32,497 |
| Tensile strength (psi) | 4345 | 4747 | 4574 | 4117 |
| Elongation @ max (%) | 6 | 155 | 171 | 193 |
| Tensile strength (break) (psi) | 3613 | 4574 | 4570 | 4115 |
| Elongation @ break (%) | 96 | 157 | 172 | 195 |

TABLE 2-continued

|  | Control Example 1 Parts | Example 2 Parts | Example 3 Parts | Example 4 Parts |
|---|---|---|---|---|
| Notched Izod (ft.lb/in) | 0.6 | 0.8 | NB | NB |
| Melt Index (gr/10 min-2160 g @ 190° C.) | 0.11 | 0.02 | 0.01 | 0.00 |
| Ave. domain size (μm) | ~5 | ~2 | ~1 | <0.5 |
| Shore D (0/15 sec) | 62/56 | 63/56 | 59/50 | 57/48 |

EXAMPLES 5–8

The examples were repeated again, however, with increasing amounts of PVB in the blend with the objective of making softer and more rubbery thermoplastic elastomers. PVC level was kept constant at 100 parts, EnBACO terpolymer grafted with about 1% maleic anhydride from DuPont as Fusabond® MG-175D was kept at 20 parts, while the PVB level was kept between 100 to 400 parts. At a level of 100 parts PVB (example 5), the morphology via TEM showed co-continuous phases. However, at levels of 200 parts and above, the PVB became a continuous phase. The results as shown in Table 3 indicate that at increasing PVB levels, the resulting alloys showed improved and excellent tensile strength of about 3000 psi or more as well as relatively hard elastomeric characteristics with a Shore A of 87–93.

TABLE 3

|  | Example 5 Parts | Example 6 Parts | Example 7 Parts | Example 8 Parts |
|---|---|---|---|---|
| Ingredients |  |  |  |  |
| PVC dry blend | 100 | 100 | 100 | 100 |
| PVB | 100 | 200 | 300 | 400 |
| EnBaCO-g-MAH | 20 | 20 | 20 | 20 |
| Anti-oxidant Irganox ® 1010 | 1 | 1 | 1 | 1 |
| Properties |  |  |  |  |
| Modulus of elasticity (psi) | 21,265 | 7,803 | 3,693 | 1,569 |
| Tensile strength (psi) | 2905 | 3826 | 3736 | 4176 |
| Elongation @ max (%) | 122 | 218 | 233 | 272 |
| Tensile strength (break) (psi) | 2544 | 3806 | 3603 | 4167 |
| Elongation @ break (%) | 129 | 220 | 234 | 271 |
| Melt Index (gr/10 min-2160 g @ 190° C.) | 3.0 | 4.5 | 4.4 | 7.8 |
| Ave. domain size (μm) | — | ~1 | ~1 | ~0.5 |
| Shore A (0/15 sec) | — | 93/87 | 88/75 | 87/70 |
| Shore D (0/15 sec) | 51/40 | 45/30 | 41/25 | 41/22 |

EXAMPLES 9–12

In examples 9–12, the components PVB/PVC/and EnBACO terpolymer grafted with 1% maleic anhydride from DuPont were kept at a constant level of 400/100/20 parts respectively in the blend. Additionally, a liquid PVC plasticizer comprising a monomeric phthalate ester, diisononyl phthalate (DINP) from Monsanto Company, St. Louis, Mo., U.S.A., was added in increasing amount of 25 to 200 parts to reduce the hardness of the blend further. As shown in Table 4, the resulting blends were relatively soft thermoplastic elastomers with excellent tensile properties of over 1500 psi and over 300% elongation. When the liquid plasticizer DINP level as increased to 100 parts and above, the blends became quite transparent. In Example 12, the blend appeared by TEM to revert back to the co-continuous morphology.

TABLE 4

|  | Example 9 Parts | Example 10 Parts | Example 11 Parts | Example 12 Parts |
|---|---|---|---|---|
| Ingredients |  |  |  |  |
| PVC dry blend | 100 | 100 | 100 | 100 |
| PVB | 400 | 400 | 400 | 400 |
| EnBaCO-g-MAH | 20 | 20 | 20 | 20 |
| Liquid plasticizer DINP | 25 | 50 | 100 | 200 |
| Anti-oxidant Irganox ® 1010 | 1 | 1 | 1 | 1 |
| Properties |  |  |  |  |
| Modulus of elasticity (psi) | 732 | 531 | 365 | 247 |
| Tensile strength (psi) | 3517 | 3326 | 2708 | 1741 |
| Elongation @ max (%) | 305 | 330 | 335 | 315 |
| Tensile strength (break) (psi) | 3508 | 3236 | 2701 | 1702 |
| Elongation @ break (%) | 304 | 331 | 335 | 316 |
| Melt index (gr/10 min-2.16 kg @ 190° C.) | 0.1 | 0.3 | 0.2 | 1.6 |
| Melt index (gr/10 min-21.6 kg @ 190° C.) | 22 | 46 | 58 | — |
| Ave. domain size (μm) | ~0.5 | ~0.5 | ~1 | — |
| Shore A (0/15 sec) | 83/67 | 82/62 | 73/53 | 68/42 |
| Shore D (0/15 sec) | 34/19 | 34/17 | 27/14 | 22/10 |

EXAMPLES 13–17

In the next five examples 13–17, the proportion of components PVB/PVC/and a solid ethylene-containing plasticizer was kept at a constant level of 50/100/20 parts respectively in the blend, and various ethylene polymers were tested including:

a) EnBACO terpolymer grafted with 1% maleic anhydride from DuPont under the trade name Fusabond® MG-175D (example 13—a repeat of example 4);

b) granules of EnBACO containing ethylene, carbon monoxide and n-butyl available from the DuPont Company under the name Elvaloy® HP-661 (example 14);

c) a copolymer of ethylene with about 62 weight percent methyl acrylate available from DuPont under the trade name Vamac® D (example 15);

d) another terpolymer of ethylene with about 68 weight percent methyl acrylate and a low level of an alkyl monoester of maleic acid also available from DuPont under the trade name Vamac® LS (example 16); and e) an ethylene-vinyl acetate copolymer with a vinyl acetate content of about 70%, sold by Bayer AG of Germany under the trade name Levapren® 700HV (example 17).

As shown in Table 5, all sample blends resulted in tough thermoplastic blends with excellent tensile properties of over 2500 psi and elongation of over 150%.

TABLE 5

| | Example 13 Parts | Example 14 Parts | Example 15 Parts | Example 16 Parts | Example 17 Parts |
|---|---|---|---|---|---|
| Ingredients | | | | | |
| PVC dry blend | 100 | 100 | 100 | 100 | 100 |
| PVB | 50 | 50 | 50 | 50 | 50 |
| EnBaCO-g-MAH | 20 | | | | |
| EnBaCO | | 20 | | | |
| Vamac D (62% methyl acrylate) | | | 20 | | |
| Vamac LS (68% MA plus cure site) | | | | 20 | |
| EVA | | | | | 20 |
| Antioxidant Irganox ® 1010 | 1 | 1 | 1 | 1 | 1 |
| Properties | | | | | |
| Modulus of elasticity (psi) | 48231 | 36235 | 44384 | 69422 | 68718 |
| Tensile strength (psi) | 4191 | 2910 | 3552 | 4683 | 3629 |
| Elongation @ max (%) | 220 | 159 | 198 | 202 | 182 |
| Tensile strength (break) (psi) | 4179 | 2837 | 3535 | 4682 | 3623 |
| Elongation @ break (%) | 221 | 185 | 203 | 203 | 184 |
| Notched Izod (ft-lb/in) | NB | 0.8 | 0.6 | 1.4 | 0.6 |
| Melt index (gr/10 min-21.6 Kg @ 190° C.) | 7.9 | 26 | 22 | 1.6 | 23 |
| Shore D (0/15 sec) | 61/51 | 58/51 | 59/50 | 58/50 | 63/50 |

As is apparent from the foregoing description, the materials prepared and procedures followed relate only to specific embodiments of the broad invention. While forms of the invention have been illustrated and described, modifications can be made without departing from the spirit and scope of the invention. Accordingly, it is not intended that the invention be limited thereby.

What is claimed is:

1. A composition comprising:
   a) 5 to 95 parts by weight of polyvinyl chloride; and
   b) 95 to 5 parts by weight of polyvinyl butyral per 100 parts by weight of said polyvinyl chloride and said polyvinyl butyral combined; and
   c) 1 to 50 parts by weight of a high-molecular weight solid ethylene-containing plasticizer per 100 parts by weight of said polyvinyl chloride, said polyvinyl butyral and said ethylene-containing plasticizer combined; and
   d) 0 to 90 parts by weight of an inorganic filler per 100 parts by weight of said polyvinyl chloride, said polyvinyl butyral and said ethylene-containing plasticizer combined; and
   e) 0 to 50 parts by weight of a low-molecular weight liquid plasticizer per 100 parts by weight of said polyvinyl chloride, said polyvinyl butyral and said ethylene-containing plasticizer combined.

2. The composition of claim 1, containing 5–25 parts by weight of a high-molecular weight solid ethylene-containing plasticizer.

3. A plastic film comprising the composition of claim 1.

4. A fabricated article comprising the composition of claim 1.

5. A composition comprising:
   a) 5 to 95 parts by weight of polyvinyl chloride;
   b) 20 to 75 parts by weight of polyvinyl butyral;
   c) 1 to 50 parts by weight of a high-molecular weight solid ethylene-containing plasticizer;
   d) 0 to 90 parts by weight of an inorganic filler; and
   e) 0 to 50 parts by weight of a low-molecular weight liquid plasticizer.

6. The composition of claim 1, wherein said high-molecular weight solid ethylene-containing plasticizer is selected from a group consisting of:
   a) ethylene/alkyl acrylate/carbon monoxide copolymers;
   b) ethylene/alkyl acrylate copolymers;
   c) ethylene/alkyl acrylate/carbon monoxide copolymers grafted with carboxylic acid anhydride groups;
   d) ethylene/alkyl acrylate copolymers grafted with carboxylic acid anhydride groups;
   e) ethylene/alkyl acrylate/mono alkyl maleate copolymers;
   f) ethylene/vinyl acetate copolymers;
   g) ethylene/vinyl acetate copolymers grafted with carboxylic acid anhydride groups;
   h) ethylene/vinyl acetate/carbon monoxide copolymers; and
   i) ethylene/vinyl acetate/carbon monoxide copolymers grafted with carboxylic acid anhydride groups.

7. The composition of claim 6, wherein the alkyl group of the alkyl acrylate contains 1–8 carbon atoms.

8. The composition of claim 6, wherein the alkyl acrylate is methyl or n-butyl acrylate.

9. A process for producing a thermoplastic blend comprising a high percentage of virgin or recovered polyvinyl butyral, comprising the steps of:
   a) blending a mixture comprising 5 to 95 parts by weight polyvinyl butyral, 1 to 50 parts by weight of a high-molecular weight solid ethylene containing solid plasticizer, 0 to about 90 parts by weight of an inorganic filler, and 0 to about 50 parts by weight of a low-molecular weight liquid plasticizer at a temperature and for a time sufficient to form a melt; and
   b) mixing into said mixture before or during melt formation 5 to 95 parts by weight polyvinyl chloride.

10. The process of claim 9, wherein said high-molecular weight solid ethylene-containing plasticizer is selected from a group consisting of:
   a) ethylene/alkyl acrylate/carbon monoxide copolymers;
   b) ethylene/alkyl acrylate copolymers;

c) ethylene/alkyl acrylate/carbon monoxide copolymers grafted with carboxylic acid anhydride groups;
d) ethylene/alkyl acrylate copolymers grafted with carboxylic acid anhydride groups;
e) ethylene/alkyl acrylate/mono alkyl maleate copolymers;
f) ethylene/vinyl acetate copolymers;
g) ethylene/vinyl acetate copolymers grafted with carboxylic acid anhydride groups;
h) ethylene/vinyl acetate/carbon monoxide copolymers; and
i) ethylene/vinyl acetate/carbon monoxide copolymers grafted with carboxylic acid anhydride groups.

11. The process of claim 9 wherein said novel thermoplastic elastomer is characterized by a tensile strength of at least 1000 psi and elongation of at least 100%.

12. The process of claim 9, further comprising the steps of shaping said blend by injection molding, blow molding, extrusion or coextrusion, compression molding or vacuum forming.

13. Shaped articles produced by the process of claim 12 in the forms of bottles, sheets, films, packaging materials, pipes, rods, laminates, sacks, bags, molded goods, granules, or powders.

* * * * *